July 20, 1948.  M. MALLORY  2,445,684
ENGINE COOLING SYSTEM, TEMPERATURE CONTROL
Filed Jan. 5, 1946
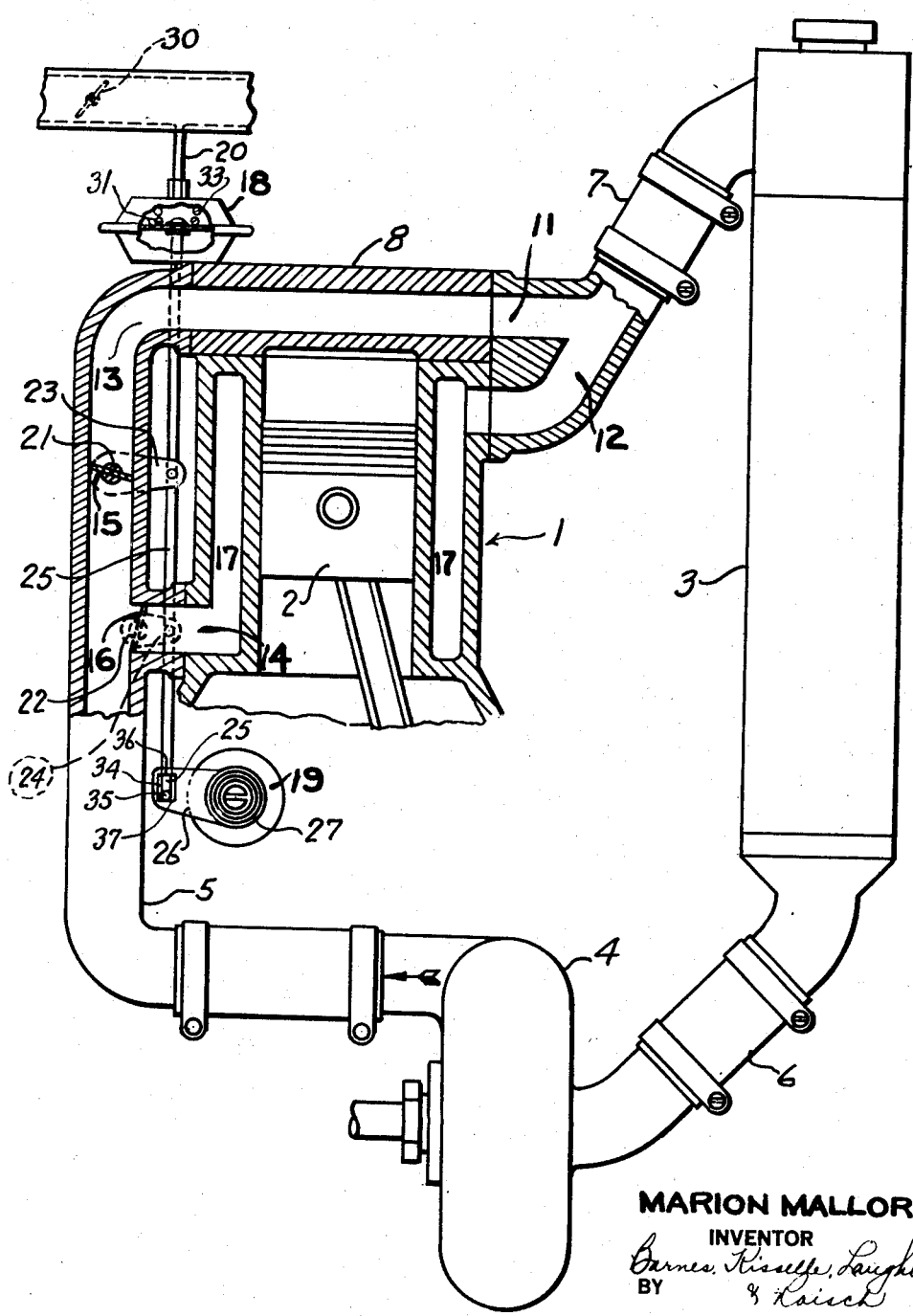
MARION MALLORY
INVENTOR
BY Barnes, Kisselle, Laughlin & Raisch
ATTORNEYS.

Patented July 20, 1948

2,445,684

UNITED STATES PATENT OFFICE 2,445,684

ENGINE COOLING SYSTEM TEMPERATURE CONTROL

Marion Mallory, Detroit, Mich.

Application January 5, 1946, Serial No. 639,175

5 Claims. (Cl. 123—178)

This invention relates to a temperature control for an internal combustion engine.

It is the object of this invention to increase the efficiency of an internal combustion engine. This object is accomplished by controlling the temperature of the combustion chamber so that the compression of the fuel mixture charge in the combustion chamber will be achieved at a higher temperature when the engine is operating at part throttle than when the engine is operating at full or wide open throttle. The effect of operating at a higher temperature at part throttle will cause the combustion to have the effect of higher compression. The maximum temperature and compression at which the engine operates at wide open throttle will be calculated to avoid spark knock or detonation and then I shall adjust my temperature control so that at part throttle the engine will operate at a higher temperature which will have the effect of raising the compression in the combustion chamber above that which would obtain if the combustion chamber temperature dropped as it normally would at part throttle due to the fact that less fuel was being burned and less heat generated in the combustion chamber.

In the drawing there is a fragmentary showing of an internal combustion engine partly in section with my heat control mechanism installed therein.

In the drawing the elements are designated as follows: internal combustion engine 1, reciprocating piston 2, radiator 3, engine driven water pump 4 having its output end connected to the cylinder head and water jacket by water line 5 and its inlet end connected to radiator 3 by water line 6, water line 7 connecting the inlet end of radiator 3 with cylinder head 8, outlet 11 from the cylinder head, outlet 12 from the cylinder block, water inlet 13 to the cylinder head, water inlet 14 to the cylinder block, butterfly valve 15 controlling the flow of water to inlet 13, butterfly valve 16 controlling the flow of water through inlet 14, water jacket 17 about the cylinder, suction device 18, thermostat 19, conduit 20 connecting the suction device 18 into the engine intake passageway on the engine side of the carburetor throttle valve 30, shafts 21 and 22 upon which valves 15 and 16 are mounted respectively, crank arms 23 and 24 fixed respectively to shafts 21 and 22 and pivotally connected to rod 25 which is connected at one end to the diaphragm 31 within suction device 18 and at the other end to the lever arm 26 of conventional thermostat 19, helical coil 27 of thermostatic bimetal for controlling arm 26.

The operation of my device is as follows: I can use either valve 15 or 16. If I use valve 15, the water circulation would be restricted or controlled through the cylinder head. If I use valve 16, the water circulation would be controlled through the block. Suction device 18 is connected into the intake passageway on the engine side of the carburetor throttle valve. Therefore, when the throttle valve is wide open, the intake passageway pressures will be high and spring 33 in suction device 18 will hold valve 15 or 16, whichever is used, open so that water or other coolant will be circulated freely by pump 4 through both the lower part and upper part of the engine water jackets. Thus, the maximum cooling will be effected by circulation of the water in the cooling system when the throttle is wide open. If the throttle is now moved toward closed or part throttle position, the pressure in the intake passageway on the engine side of the throttle valve will fall thereby causing suction device 18 to lift rod 25 which swings valve 15 or 16, whichever is being used, toward closed or to fully closed position, thus reducing the circulation of water from pump 4 through the cylinder head or cylinder block. By restricting or completely cutting off the circulation in the cylinder block by closing valve 15, the cylinder head will run hotter than the cylinder block because the circulation will be free to flow through the cylinder block but not through the cylinder head. By closing valve 16 the cylinder block will run hotter than the cylinder head because the water will be free to flow through the cylinder head but not through the cylinder block.

The thermostat 19 opposes the suction means so that, in the event the cylinder head or cylinder block should become too hot, the thermostat will open valve 15 or 16, whichever is being used. When the engine is cold, the thermostat opposes the vacuum control means and holds valves 15 or 16 closed until the engine warms up to the maximum temperature and compression at which the engine will operate at wide open throttle without spark knock.

Rod 25 has a bent end 35 which engages arm 26 in slot 34. Arm 26 moves clockwise as the temperature falls and counterclockwise as the temperature rises. When the engine is cold, end 35 of rod 25 will rest against the bottom edge 37 of opening 34 and valves 15 and 16 will be closed. As the engine warms up, bottom edge 37 moves away from end 35. If the engine becomes too hot, then the upper edge 36 of opening 34 will engage end 35 of rod 25 and move valves 15 and 16 toward open position to permit circulation of the coolant through the cylinder head and jacket.

Instead of positioning valves 15 and 16 in the position shown, I can position either of these valves in water line 7 and control the circulation of water through the entire engine block instead of just through the upper part or lower part of the block.

I claim:

1. In an internal combustion engine having an intake passageway, a throttle valve controlling the flow of motive fluid through said passageway, and a liquid coolant system for said engine, the combination comprising means actuated by changes of pressure in the intake passageway on the engine side of said throttle valve for controlling the circulation of liquid through said coolant system, said means responding to a fall in pressure in said intake passageway to decrease the circulation of liquid through said cooling system and responding to a rise in pressure in said intake passageway to increase the circulation of liquid through said cooling system, and temperature responsive means in heat exchange relation with the engine and operatively connected to said pressure actuated means whereby when the engine becomes too hot said thermostatic means increases the circulation of liquid through said cooling system.

2. In an internal combustion engine having an intake passageway, a throttle valve controlling the flow of motive fluid through said intake passageway, a combustion chamber, a coolant chamber in heat exchange relation with said combustion chamber, a liquid coolant in said coolant chamber, means for circulating the liquid coolant through said chamber, a valve controlling said circulation, and means actuated by changes in pressure in the intake passageway on the engine side of said throttle valve, a connection between said last mentioned means and said valve whereby said means responds to a rise in said intake passageway pressure to open said valve and to a fall in said intake passageway pressure to close said valve, and temperature responsive means in heat exchange relation with said engine and operatively connected to said liquid control valve whereby when the engine becomes too hot said temperature responsive means responds to such rise in temperature and moves said valve toward open position irrespective of said intake passageway pressure.

3. In an internal combustion engine comprising a combustion chamber, an intake passageway, a throttle valve controlling the flow of motive fluid through said intake passageway, a body of coolant liquid in heat exchange relation with said combustion chamber, a valve controlling the circulation of said body of coolant liquid, and means actuated by changes in pressure in the intake passageway on the engine side of said throttle valve for operating said liquid control valve whereby said means responds to a fall in said intake passageway pressure to operate said control valve and decrease the circulation of coolant liquid and responds to a rise in said intake passageway pressure to operate said control valve and increase the circulation of coolant liquid, and temperature responsive means in heat exchange relation with said engine and operatively connected to said liquid control valve whereby when the engine is operating below substantially the maximum temperature at which the engine will operate at wide open throttle without spark knock said temperature responsive means opposes the pressure actuated means so that the pressure actuated means is ineffective to open said liquid control valve.

4. The combination as set forth in claim 3 wherein said temperature responsive means also opposes said pressure actuated means when the engine becomes too hot and opens said liquid control valve to increase the circulation of the liquid through the cooling system.

5. In an internal combustion engine comprising a combustion chamber, an intake passageway, a throttle valve controlling the flow of motive fluid through said intake passageway, a body of coolant liquid in heat exchange relation with said combustion chamber, a valve controlling the circulation of said body of coolant liquid, and means actuated by changes in pressure in the intake passageway on the engine side of said throttle valve for operating said liquid control valve whereby said means responds to a fall in said intake passageway pressure to operate said control valve and decrease the circulation of coolant liquid and responds to a rise in said intake passageway pressure to operate said control valve and increase the circulation of coolant liquid, and temperature responsive means in heat exchange relation with said engine and having a limited lost motion connection with said liquid control valve whereby at one limit of the connection when the engine is operating below substantially the maximum temperature at which the engine will operate at wide open throttle without spark knock said temperature responsive means opposes the pressure actuated means so that the pressure actuated means is ineffective to open said liquid control valve and at the other limit of the lost motion connection when the engine becomes too hot said temperature responsive means will respond to such rise in temperature in opposition to the pressure actuated means and move the liquid control valve toward open position to increase the circulation through said cooling system and between said limits said pressure actuated means will be free to actuate said liquid control valve in response to intake passageway pressure as above specified.

MARION MALLORY.

REFERENCES CITED

The following references are of record in the file of this patent:

UNITED STATES PATENTS

| Number | Name | Date |
|---|---|---|
| 1,335,391 | Rayfield | Mar. 30, 1920 |
| 1,418,397 | Rayfield | June 6, 1922 |
| 1,677,103 | Tice | July 10, 1928 |
| 1,793,841 | Curtis | Feb. 24, 1931 |